INVENTORS
Thomas E. Kirk
David J. Hartman
BY
C. R. Meland
Their Attorney

INVENTORS
Thomas E. Kirk
David J. Hartman
BY
C. R. Meland
Their Attorney

INVENTORS
Thomas E. Kirk
David J. Hartman
BY
C. R. Meland
Their Attorney

United States Patent Office 3,521,148
Patented July 21, 1970

3,521,148
SEMICONDUCTOR VOLTAGE REGULATOR FOR A GENERATOR WITH MAIN AND BUCKING FIELD WINDINGS
Thomas E. Kirk, Anderson, Ind., and David J. Hartman, Minneapolis, Minn., assignors to General Motors Corporation, Detroit, Mich., a corporation of Delaware
Original application Sept. 20, 1963, Ser. No. 310,195, now Patent No. 3,364,416, dated Jan. 16, 1968. Divided and this application Nov. 3, 1967, Ser. No. 680,499
Int. Cl. H02p 9/30
U.S. Cl. 322—28    4 Claims

ABSTRACT OF THE DISCLOSURE

This invention relates to a semiconductor voltage regulator which is capable of controlling both the main and bucking field windings of a generator. The system includes a voltage responsive circuit which senses the output voltage of the generator. The voltage responsive circuit controls the application of gate signals to groups of controlled rectifiers which respectively feed the main and bucking field windings of the generator. The voltage responsive circuit turns off the gate signals to the controlled rectifiers that feed the main field winding and turns on the controlled rectifiers that feed the reverse field winding when a high voltage condition exists. When the output voltage of the generator drops below a predetermined value the conduction states of the groups of controlled rectifiers is changed so that the main field winding is now supplied with current and current is cut off to the bucking field winding.

---

This application is a division of application Ser. No. 310,195, now Pat. No. 3,364,416, filed on Sept. 20, 1963.

This invention relates to semiconductor voltage regulators and more particularly to a voltage regular which has a plurality of controlled rectifiers for controlling the field current of an AC generator or the like.

One of the objects of this invention is to provide a semiconductor voltage regulator which is capable of handling high field currents. This object is carried forward by providing silicon controlled rectifiers which control the field current of the generator.

Another object of this invention is to provide a semiconductor voltage regulator which is of relatively low cost. In carrying this object forward, the regulator circuit eliminates expensive electrolytic capacitors which are required in certain types of semiconductor voltage regulators.

Another object of this invention is to provide a semiconductor voltage regulator for an alternating current generator which has its output rectified by a three phase full wave bridge rectifier. In carrying this object forward, a plurality of controlled rectifiers are connected between the AC input terminals of the bridge rectifier and the field winding of the generator for controlling the field current. These controlled rectifiers have their condunction controlled by an oscillator circuit which responds to the value of output voltage of the AC generator and which serves to control the conduction of the controlled rectifiers.

Still another object of this invention is to provide a voltage regulator which has controlled rectifiers for controlling the field current of a generator or the like and wherein the controlled rectifiers obtain turn-on signals from an oscillator circuit which includes a unijunction transistor.

A further object of this invention is to provide a controlled rectifier voltage regulator which is capable of controlling the field current of a generator which has both a main field and a bucking field.

Further objects and advantages of the present invention will be apparent from the following description, reference being had to the accompanying drawings where preferred embodiments of the present invention are clearly shown.

Figure 1:
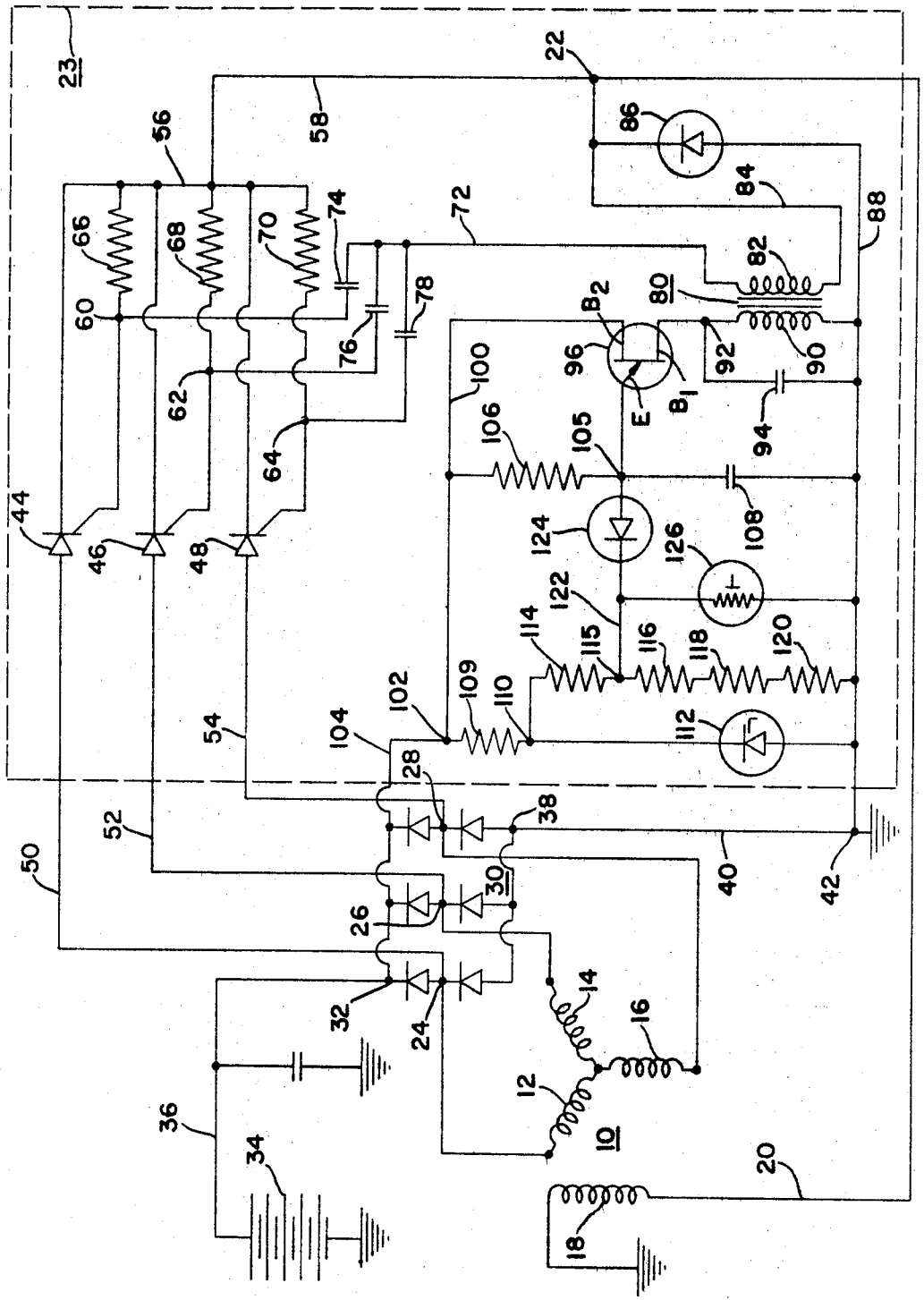
Figure 2:
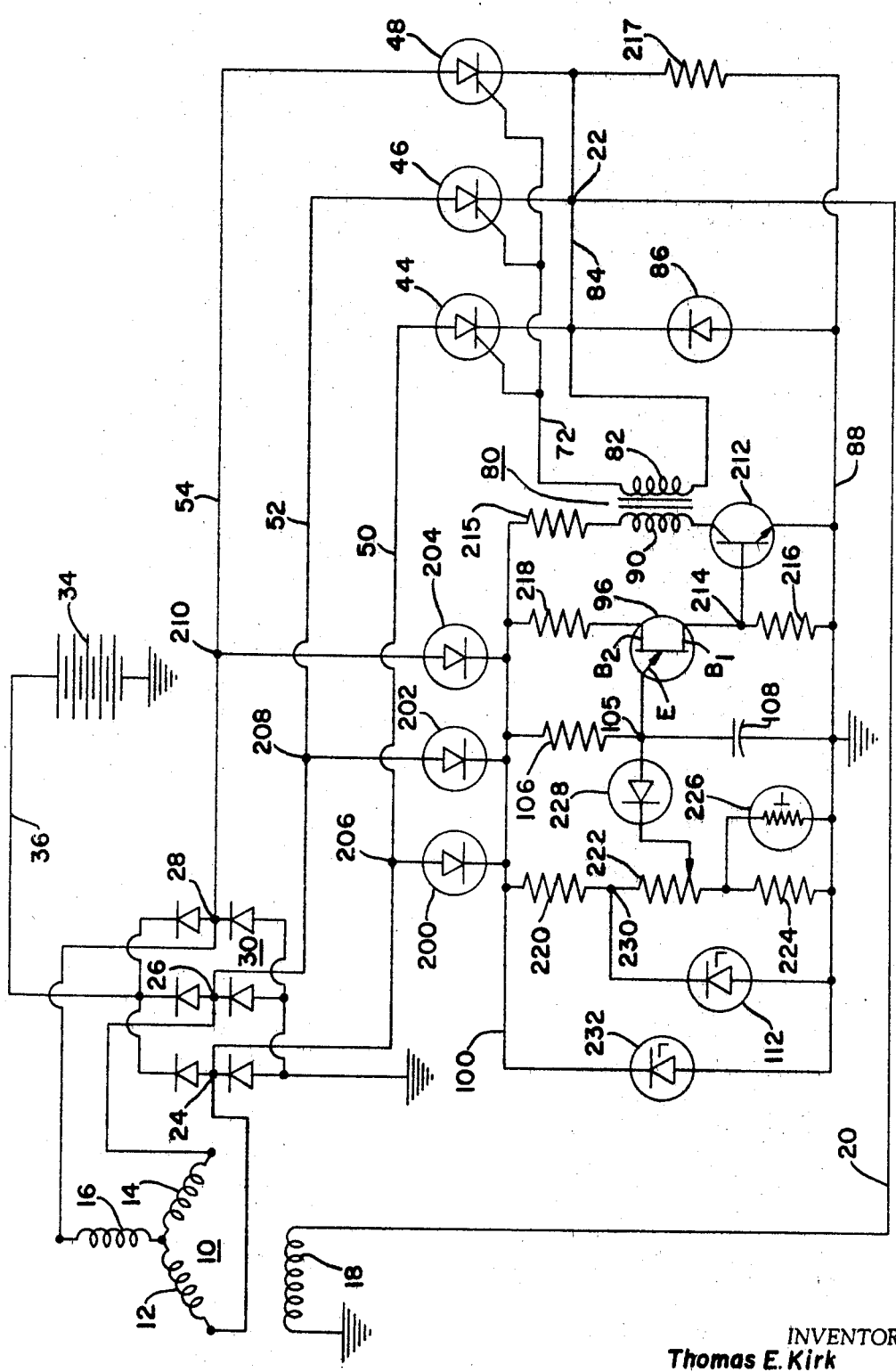
Figure 3:
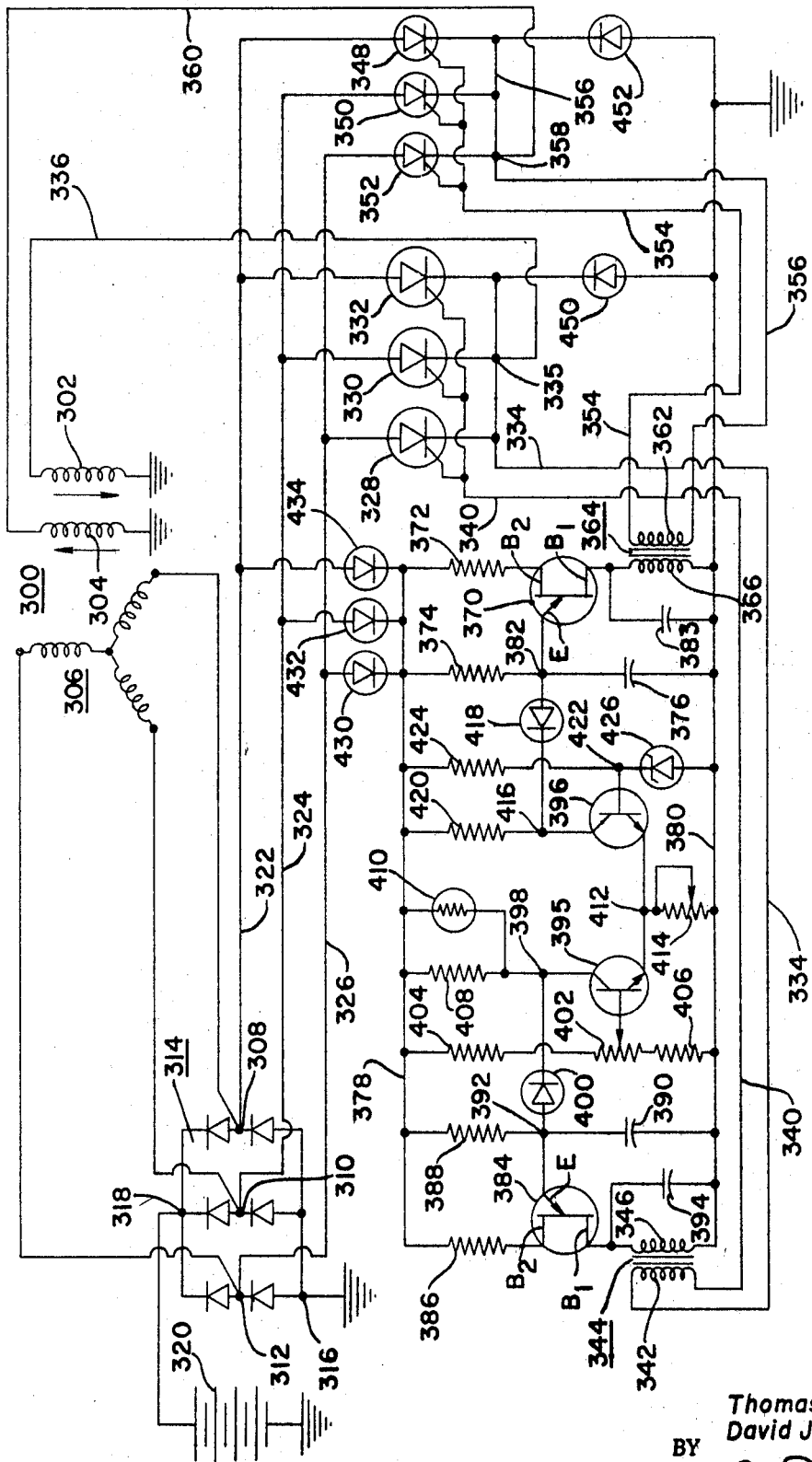

In the drawings:
FIG. 1 is a schematic circuit diagram of a voltage regulator made in accordance with this invention shown connected with a generator.
FIG. 2 is a schematic circuit diagram of a modified controlled rectifier voltage regulator made in accordance with this invention and shown connected with a generator.
FIG. 3 is a schematic circuit diagram of a controlled rectifier voltage regulator that is shown controlling the field current of a generator which has a main field and a bucking field.

Referring now to the drawings and more particularly to FIG. 1, the reference numeral 10 generally designates an alternating current generator which has a three phase output winding comprised of phase windings 12, 14 and 16. The phase windings 12, 14 and 16 are shown in a Y-connection but it will be appreciated by those skilled in the art that they could be delta connected if so desired. The generator 10 has a field winding designated by reference numeral 18. One side of the field winding 18 is grounded whereas the opposite side of this field winding is connected with conductor 20 which goes to the field terminal 22 of the controlled rectifier voltage regulator 23.

The Y-connected three phase output winding of the generator 10 is connected with the AC input terminals 24, 26 and 28 of a three phase full wave bridge rectifier network generally designated by reference numeral 30. The diodes that make up this bridge rectifier network are preferably of the pn junction semiconductor type and may be silicon diodes. The positive DC output terminal 32 of the bridge rectifier network is connected to the positive side of a battery 34 via the conductor 36. The opposite side of the battery is grounded as shown. The negative DC output terminal 38 of the bridge rectifier 30 is connected with conductor 40 and this conductor is connected with junction 42 which is grounded as shown.

The voltage regulator of this invention has three silicon controlled rectifiers respectively by reference numerals 44, 46 and 48. The anode of controlled rectifier 44 is connected with AC input terminal 24 by a conductor 50. In a similar fashion, the anodes of controlled rectifiers 46 and 48 are connected respectively with the AC input terminals 26 and 28 of the bridge rectifier 30 via conductors 52 and 54. The cathodes of the controlled rectifiers 44 through 48 are connected with a common conductor 56. The conductor 56 is connected with conductor 58 which in turn is connected to the field terminal 22 of the voltage regulator.

The gate electrodes of controlled rectifiers 44, 46 and 48 are connected respectively with junctions 60, 62 and 64. The resistors 66, 68 and 70 are respectively interposed between the junctions 60 through 64 and the common conductor 56. The junctions 60, 62 and 64 are all connected with a conductor 72 via the capacitors 74, 76 and 78.

The controlled rectifier regulator of this invention includes a transformer generally designated by reference numeral 80. The output winding 82 of this transformer has one side thereof connected with conductor 72. The opposite side of winding 82 is connected with a conductor 84 which in turn is connected with the field terminal 22 of the regulator. A field discharge diode 86 is connected between conductor 84 and the grounded conductor 88. This diode 86 is therefore connected in parallel with the generator field winding 18.

The other winding 90 of the transformer 80 has one side thereof connected with the grounded conductor 88. The opposite side of winding 90 is connected with junction 92 and it is seen that a capacitor 94 connects the junction 92 and the grounded conductor 88.

The reference numeral 96 designates a unijunction transistor. This transistor has an emitter electrode E and two base electrodes $B_1$ and $B_2$.

The unijunction transistor is a three terminal semiconductor device which has a highly stable negative resistance characteristic which permits its application in oscillator circuits. The device consists of two ohmic contacts, namely the base $B_1$ and the base $B_2$ which are made at opposite ends of an N-type silicon bar. A single rectifying contact called the emitter is made on the opposite side of the bar.

The characteristics of the unijunction transistor 96 are such that the unijunction transistor will exhibit a negative resistance characteristic between its emitter electrode E and its base $B_1$ under the proper biasing conditions. This negative resistance characteristic is achieved when the voltage which is applied between the emitter electrode E and the base $B_1$ is greater than a certain constant times the voltage appearing between the base $B_2$ and base $B_1$. Thus as the voltage which appears between base $B_1$ and the base $B_2$ increases, it requires more voltage between the emitter E and the base $B_1$ to cause the unijunction transistor to go into its negative resistance characteristic where it conducts heavily between its emitter E and its base $B_1$.

The base $B_2$ of the unijunction transistor 96 is connected with a conductor 100. The conductor 100 is connected with a junction 102 which is connected with the positive terminal 32 of the bridge rectifier 30 by a conductor 104.

The base $B_1$ of the unijunction transistor is connected with the junction 92 and therefore is connected to one side of the transformer winding 90.

The emitter E of the unijunction transistor 96 is connected with a junction 105. A resistor 106 connects the conductor 100 and the junction 105. A capacitor 108 is connected between the junction 105 and ground.

The junction 102 is connected to one side of a resistor 109. The opposite side of resistor 109 is connected with junction 110 and a Zener diode 112 is connected between junction 110 and ground. The junction 110 is also connected to ground through resistors 114, 116, 118 and 120 which form a voltage divider. The junction 115 of resistors 114 and 116 is connected with conductor 122. A pn junction semiconductor diode 124 connects the conductor 122 and the junction 105. A temperature compensating thermistor designated by reference numeral 126 is connected between conductor 122 and ground.

It will be appreciated by those skilled in the art that when the gate electrodes of the controlled rectifiers 44, 46 and 48 are positive with respect to their cathodes, these controlled rectifiers will conduct in their anode-cathode circuits and operate as conventional diodes. When these controlled rectifiers are biased to conduct, the field winding 18 will be supplied with current from the conductor 58, junction 22 and conductor 20. When in a conducting state, it will be appreciated that the controlled rectifiers 44 through 48 together with three diodes of the bridge rectifier 30 form a three phase full wave bridge rectifier network for supplying field current to the generator 18. On the other hand, when the controlled rectifiers are not gated to conduct, the circuit to the field winding 18 is substantially open and field current is cut off.

The gating pulses to switch the controlled rectifiers 44, 46 and 48 on are taken from the winding 82 of the transformer 80 and are supplied to the gate electrodes of the controlled rectifiers through the capacitors 74, 76 and 78. The voltage developed across the winding 82 is the output voltage of an oscillator or pulse generator which is comprised of a transformer 80, the unijunction transistor 96, resistor 106 and capacitor 108.

The oscillator that has just been described is voltage sensitive and its operation is regulated by a voltage reference bridge which includes resistors 109, 114, 116, 118 and 120, a thermistor 126 and the Zener diode 112.

It can be seen that when power is supplied, the capacitor 108 is charged through the resistor 106 from conductor 100 to ground. The capacitor 108 is charged toward the value of voltage appearing between conductor 100 and ground and the potential of junction 105 therefore rises. When the potential appearing between junction 105 and ground reaches the firing voltage of the unijunction transistor 96, this transistor will break down between its emitter E and its base $B_1$ and the capacitor 108 will discharge through the emitter E and base $B_1$ of the unijunction producing a pulse of voltage in the secondary winding 82 which is positive at conductor 72. This voltage will drive the gate electrodes of the controlled rectifiers 44 through 48 positive with respect to their cathodes which causes these controlled rectifiers to switch on in their anode-cathode circuits.

When capacitor 108 discharges, the voltage at junction 105 drops to a point where conduction ceases between the emitter and base $B_1$ of the unijunction transistor 96. The maximum frequency of voltage applied across the anode and cathode of controlled rectifiers 44, 46 and 48 at the highest generator speed is 1000 c.p.s. The oscillator has an output of 5000 c.p.s. and the controlled rectifiers are therefore supplied an essentially constant gate signal with the oscillator "on." With the oscillator "off" the gate signals are removed and as anode voltage goes to zero the controlled rectifiers turn "off."

The operation of the oscillator circuit which includes the unijunction transistor 96 is controlled by the voltage appearing between conductor 100 and ground. When this voltage rises to a predetermined point, the voltage appearing between the base electrodes $B_1$ and $B_2$ of the unijunction transistor 96 increases. Since this voltage has increased, it takes a greater voltage between the emitter E and the ground of the unijunction transistor 96 to drive it into its negative resistance characteristic.

The junction 115 is maintained at a substantially constant potential with respect to ground due to the fact that it is shunted by the Zener diode 112. The junction 105 is clamped to the voltage of junction 115 due to the provision of the diode 124 and when the voltage appearing between conductor 100 and ground rises above some predetermined value, the voltage at junction 105 cannot go high enough to trigger the unijunction transistor 96. This means that when the voltage output of the generator 10 is too high, the unijunction transistor 96 is not triggered and the oscillator does not therefore have an output to provide turn on signals for the controlled rectifiers 44 through 48. When the output voltage of the generator 10 reduces below some predetermined value, the voltage appearing between conductor 100 and ground reduces accordingly and a point is reached where the voltage at junction 105 will be sufficient to trigger the unijunction transistor 96. The unijunction transistor which forms a part of the oscillator circuit therefore conducts and pulses of voltage serve to switch on the controlled rectifiers 44, 46 and 48 and the field current for field winding 18 is therefore increased to increase the output voltage of the generator 10.

It will be appreciated that the voltage regulator of this invention regulates the output voltage of the generator 10 and the output voltage of the bridge rectifier 30 by controlling the oscillation of the oscillator circuit which includes the unijunction transistor 96 in accordance with the voltage appearing between conductor 100 and ground. The oscillator circuit in turn controls the switching on and off of the controlled rectifiers 44 through 48 which control the field current being supplied to the field winding 18. The capacitor 94 serves as a bypass capacitor.

Referring now more particularly to FIG. 2, a modified electrical system made in accordance with this invention is illustrated. In FIG. 2, the same reference numerals have been used as were used in FIG. 1 to identify identical parts in each figure. In the FIG. 2 embodiment, the gate electrodes of the controlled rectifiers 44, 46 and 48 are connected directly with the conductor 72 rather than to a capacitor. In addition, the resistors 66, 68 and 70 have been eliminated and the cathodes of the controlled rectifiers 44, 46 and 48 are connected directly with the conductor 84 which is also connected with the field terminal 22 of the voltage regulator. The field terminal 22, like the embodiment of FIG. 1, is connected with one side of the field winding 18 via the conductor 20.

In the FIG. 2 embodiment, three additional diodes 200, 202 and 204 are illustrated. These diodes may be of the pn junction semiconductor type and can be of the silicon type and it is seen that the cathodes of these diodes are all connected with the conductor 100. The opposite sides of these diodes are connected with conductors 50, 52 and 54 at junctions 206, 208 and 210.

The voltage regulator circuit of FIG. 2 contains an additional stage of amplification to facilitate initial build up of an alternating current generator having some degree of residual magnetism in its field winding. This additional stage of amplification takes the form of an npn transistor 212 which has its emitter electrode connected with the grounded conductor 88 and has its collector electrode connected with one side of transformer winding 90. The base electrode of transistor 212 is connected with junction 214 which is located between resistor 216 and the unijunction transistor 96 which performs the same function as the unijunction transistor 96 shown in FIG. 1. The opposite side of resistor 216 is grounded at conductor 88 and a resistor 218 is connected between the base $B_2$ of unijunction transistor 96 and the conductor 100. The emitter E of the unijunction transistor 96 is again connected with a junction 105 the same as in FIG. 1. The resistor 106 connects the junction 105 and the conductor 100 while the capacitor 108 connects the junction 105 and the grounded conductor 88. A resistor 217 is connected between the field terminal 22 and ground.

The voltage divider in FIG. 2 is comprised of resistors 220, 222 and 224. A thermistor 226 which is used for temperature compensation is connected across resistor 224. A silicon diode 228 connects a tap on the resistor 222 with junction 105. The Zener diode 112 is connected between the junction 230 and the grounded conductor 88. A Zener diode 232 is connected between conductor 100 and the grounded conductor 88 as is clearly apparent from FIG. 2.

The voltage regulator of FIG. 2 differs from the system of FIG. 1 for the most part in two respects. First of all, the voltage sensed by the voltage divider and oscillator are provided by the diodes 200, 202 and 204 rather than being provided by the output voltage of the bridge rectifier as is the case in FIG. 1. The other difference is that in FIG. 2, the unijunction transistor 96 is not connected in series with the winding 90 of the transformer 80. Instead of this, the output voltage of the unijunction transistor 96 controls the potential of junction 214 which in turn controls the voltage applied between the base and emitter electrodes of the npn transistor 212. The transistor 212 therefore follows the output voltage of the unijunction transistor 96 so that pulses of voltage are developed in the transformer winding 82 the same as in FIG. 1 to provide turn-on pulses for the controlled rectifiers 44, 46 and 48.

As pointed out above, the diodes 200, 202 and 204 make up a bridge rectifier to provide DC power to the control circuit of the voltage regulator and these diodes also isolate the control circuit from the battery 34. The transistor 212 serves as an amplifier to provide sufficient turn-on signals to the controlled rectifiers at low input voltages. The addition of transistor 212 also eliminates the minimum supply voltage requirement on a unijunction transistor oscillator to insure firing of the controlled rectifiers 44, 46 and 48 at all operating temperatures.

Referring now more particularly to FIG. 3, a voltage regulating system is illustrated for controlling a generator that has a main field and a bucking field. In FIG. 3, the generator is designated in its entirety by the reference numberal 300 and this generator is of the alternating current type having a main field winding 302 and a bucking field winding 304. The flux generated by the bucking field winding 304 opposes the flux generated by the main field winding 302 as is well known to those skilled in the art. The generator 300 has a three phase Y-connected output winding generally designated by reference numeral 306. As pointed out hereinbefore, this output winding could be delta connected rather than Y-connected if so desired.

The phase windings of the output winding 306 are connected with the AC input terminals 308, 310 and 312 of a three phase full-wave bridge rectifier network generally designated by reference numeral 314. The six diodes that make up the bridge rectifier network 314 are preferably of the pn junction semiconductor type and may be of the silicon type. The bridge rectifier 314 has a negative DC terminal 316 which is grounded and has a positive DC output terminal 318 which is connected to charge a battery 320.

The AC input terminals of the bridge rectifier 314 are connected respectively with conductors 322, 324 and 326. The conductors 322, 324 and 326 are connected respectively with the anodes of silicon controlled rectifiers 328, 330 and 332. The cathodes of the controlled rectifiers 328, 330 and 332 are connected with a common conductor 334. The conductor 334 is connected with a field terminal 335 of the voltage regulator and this field terminal is connected to one side of the main field winding 302 via a conductor 336. The opposite side of the main field winding 302 is grounded as shown.

A conductor 340 is connected to one side of the secondary winding 342 of a transformer generally designated by reference numeral 344. The opposite side of the secondary winding 342 is connected with conductor 334 which in turn is connected to the cathodes of the controlled rectifiers 328, 330 and 332. The gate electrodes of controlled rectifiers 328, 330 and 332 are connected with conductor 340. The transformer 344 has a primary winding 346 as is clearly apparent from FIG. 3.

The conductors 322, 324 and 326 are also connected respectively with the anodes of controlled rectifiers 348, 350 and 352. The gate electrodes of the controlled rectifiers 348, 350 and 352 are connected with a conductor 354. The cathodes of the controlled rectifiers 348, 350 and 352 are connected with a conductor 356. A field terminal 358 is connected with a conductor 360 which is connected to one side of the bucking field winding 304. The opposite side of the bucking field winding 304 is grounded as shown.

The conductor 354 is connected with one side of a secondary winding 362 of a transformer 364. The opposite side of the secondary winding 362 is connected with conductor 356 and it therefore is seen that the gate and cathode electrodes of the controlled rectifiers 348, 350 and 352 are connected across the secondary winding 362 of the transformer 364. The transformer 364 has a primary winding 366.

The conduction of the groups of controlled rectifiers connected respectively with the main field winding 302 and the bucking field winding 304 is controlled by a pair of unijunction transistor oscillators which in turn are controlled by a voltage sensing circuit. One of these unijunction transistor oscillator circuits includes the unijunction transistor 370, the resistor 372, the transformer 364, the resistor 374 and the capacitor 376. The resistor 374 and capacitor 376 are connected across the conductors 378 and 380, the conductor 380 being grounded as shown. The emitter E of the unijunction transistor 370 is connected with the junction 382 which corresponds to the junction 105 shown in FIG. 1. The base $B_2$ of the unijunction transistor 370 is connected with resistor 372 and it is seen that the base $B_1$ of the unijunction transistor 370 is connected to one side of the primary winding 366 which is shunted by the capacitor 383.

The other unijunction transistor oscillator includes the unijunction transistor 384, the resistor 386, the transformer 344, the resistor 388, and the capacitor 390. The base $B_2$ of transistor 384 is connected to one side of resistor 386 whereas the emitter E of transistor 384 is connected with a junction 392. The base $B_1$ of transistor 384 is connected to one side of primary winding 346 and this primary winding is shunted by a capacitor 394.

The system of FIG. 3 uses npn transistors 395 and 396. The collector of transistor 395 is connected with junction 398 and this junction is connected with the junction 392 through a silicon diode 400. The base of transistor 395 is connected with the shiftable tap on a potentiometer resistor 402. The resistor 402 together with resistors 404 and 406 form a voltage divider which is connected across the conductors 378 and 380. A resistor 408 is connected between the junction 398 and conductor 378 and this resistor is shunted by a temperature compensating resistor 410. The emitter of transistor 395 is connected with a junction 412. A variable resistor 414 is connected between junction 412, and the grounded conductor 380.

The collector of transistor 396 is connected with a junction 416. The junction 416 is connected with junction 382 via a silicon diode 418. A resistor 420 is connected between junction 416 and the conductor 378. The emitter electrode of transistor 396 is connected with junction 412. The base electrode of transistor 396 is connected with junction 422. A resistor 424 connects the junction 422 and the conductor 378. A Zener diode 426 is connected between junction 422 and the grounded conductor 380.

A DC voltage is applied to the conductor 378 from the conductors 322, 324 and 326 via the silicon diodes 430, 432 and 434. It will be appreciated that the diodes 430, 432 and 434 together with three diodes of the bridge rectifier 314 form a three phase full wave bridge rectifier network which supplies direct current between conductor 378 and the grounded conductor 380. The diodes 450 and 452 are field discharge diodes.

The operation of the regulating system shown in FIG. 3 will now be described. It will be appreciated that the current flowing through the main field winding 302 will be controlled by the turning on and turning off of the controlled rectifiers 328, 330 and 332. These controlled rectifiers receive turn-on signals from conductors 334 and 340 which are connected across the secondary winding 342 of the transformer 344. When there are no turn-on signals developed by the secondary winding 342, the controlled rectifiers 328, 330 and 332 are turned off when the voltage of their anodes goes to zero during a part of the AC cycle of the voltage developed by the three phase output winding 306.

In a similar fashion, the current for the bucking field winding 304 is controlled by the conduction and nonconduction of the controlled rectifiers 348, 350 and 352 in their anode-cathode circuits. The conduction of controlled rectifiers 348, 350 and 352 is controlled by the voltage appearing between their gate and cathode electrodes and this is the voltage that is developed across the secondary winding 362 of the transformer 364. Thus the secondary winding 362 can apply turn-on signals to the controlled rectifiers 348, 350 and 352 in the same manner as the secondary winding 342 can apply turn-on signals for the controlled rectifiers 328, 330 and 332.

Assuming now that the generator 300 has built-up due to residual magnetism in its field structure, a voltage will be applied between conductors 378 and 380 by the diodes 430, 432 and 434. When the voltage appearing between conductors 378 and 380 is below a desired regulated voltage, the transistor 396 is on its collector-emitter circuit and the transistor 395 is off in its collector-emitter circuit. Transistor 396 is on since the potential of its base electrode which is the potential of junction 422 is positive with respect to its emitter. Under these conditions, the potential of junction 416 is essentially positive with respect to ground by an amount that is equal to the breakdown voltage of the Zener diode 426. This potential at junction 416 is not sufficient to trigger the unijunction transistor 370 and as a result, there are no turn-on signals developed in the secondary winding 362. Because of this, the controlled rectifiers 348, 350 and 352 do not receive any turn-on signals and there therefore is no current supplied to the buckling field winding 304.

With transistor 396 switched on and transistor 395 switched off, the potential of junction 398 is essentially the potential of the positive conductor 378. This potential is sufficient to cause the unijunction transistor 384 to switch on and off and causes an oscillating action which develops output pulses at the secondary winding 342 of the transformer 344. The voltage pulses developed across secondary winding 342 provide turn on signals for the controlled rectifiers 328, 330 and 332. With controlled rectifiers 328, 330 and 332 being switched on, the current flow through the main field winding 302 increases and the generator therefore builds up in the normal manner toward its regulated output voltage.

When the voltage appearing across conductors 378 and 380 rises above the desired regulated value, the oscillator circuit which includes the unijunction transistor 384 is switched off whereas the oscillator circuit that includes the unijunction transistor 370 is switched on. As the potential of conductor 378 increases in a positive manner, the voltage at the tap of resistor 402 rises. This drives the base of transistor 395 positive with respect to its emitter and the transistor 395 starts to swich on in its collector-emitter circuit. This causes an increase in current flow through the resistor 414 which applies a bias to the emitter of transistor 396, tending to switch it off. This action is regenerative and in time, the transistor 396 switches off and the transistor 395 switches fully on. Under this condition, the junction 416 has substantially the same voltage as the conductor 378 which is positive while the junction 398 has a voltage which is lower than that of junction 416. This causes the unijunction transistor 384 to be switched off and causes the unijunction transistor 370 to be switched on. As a result, there are no gate signals developed in the secondary 342 and the controlled rectifiers 328, 330 and 332 are therefore switched off. This switches off the field current in the main field 302 and the turning on of the unijunction transistor 370 causes an increase in the field current through the bucking field 304 due to the fact that the controlled rectifiers 348, 350 and 352 now receive turn-on signals from the secondary winding 362. With no power to the main field 302 and full power to the bucking field 304, the output voltage decreases until the voltage which is developed at the tap of resistor 402 no longer exceeds the voltage required to turn on the transistor 395 whereupon transistor 395 is driven to a nonconductive state and transistor 396 resumes its conduction. This causes the oscillator circuit which includes the transistor 370 to be turned off which causes the controlled rectifiers 348, 350 and 352 to be switched off to turn off the current flow in the bucking field 304. The oscillator circuit which includes unijunction transistor 384 now once more starts to operate to switch on the controlled rectifiers 328, 330 and 332 and the main field therefore again receives field current to cause the generator to maintain its desired regulated output.

Although the regulator circuit of FIG. 3 has been shown as controlling the main and bucking field circuits of an alternating current generator, it will be appreciated that this circuit could have other uses and that the basic principle of this regulator circuit could be used whenever alternating control of two outputs is desired.

In each of the embodiments of this invention, the generator initially builds up by residual magnetism in its field structure. If this residual magnetism is not sufficient, the generator fields can be initially energized from the battery through suitable circuitry to provide for initial build up of the generator.

While the embodiments of the present invention as herein disclsoed constitute a preferred form, it is to be understood that other forms might be adopted.

What is claimed is:

1. An electrical system comprising, an alternating current generator having an output winding, a main field winding and a bucking field winding, the flux developed in said bucking field opposing the flux developed by main field winding, at least one first controlled rectifier connected with said output winding and with said main field winding for controlling current supplied to said main field winding from said output winding, at least one other second controlled rectifier connected with said output winding and with said bucking field winding for controlling the current flow through bucking field winding, means connected with the output winding of said generator for developing a direct current voltage across control conductors which is a function of the output voltage of said generator, first and second oscillator circuits each including a unijunction transistor, means coupling said first unijunction transistor with the gate of said first controlled rectifier whereby said unijunction transistor supplies gate signals to said first controlled rectifier when said first oscillator circuit develops an output signal, means coupling said second unijunction transistor to said second controlled rectifier and operative to supply gate signals to said second controlled rectifier when said second oscillator circuit develops an output signal, said first oscillator circuit including a first resistor and a first capacitor connected across said control conductors having a junction connected with the emitter of said first unijunction transistor, said second oscillator circuit including a second resistor and a second capacitor series connected across said control conductors and having a junction coupled to the emitter of said second unijunction transistor and a control circuit connected across said control conductors and with said junction of said resistors and capacitors for biasing said first oscillator circuit conductive and said second oscillator nonconductive when the voltage applied to said control conductors is above a predetermined value and operative to bias said second oscillator circuit conductive and said first oscillator circuit nonconductive when said direct current voltage is below a predetermined value.

2. An electrical system comprising, an alternating current generator having a polyphase output winding and main and bucking field windings, a polyphase bridge rectifier comprised of a plurality of diodes connected with said polyphase output winding, a first plurality of controlled rectifiers connected with said output winding and with said main field winding, said first plurality of controlled rectifiers and certain diodes of said bridge rectifier providing an energizing circuit for said main field winding, a second plurality of controlled rectifiers connected with said output winding and with said bucking field winding, said second plurality of controlled rectifiers and certain diodes of said bridge rectifier forming an energizing circuit for said bucking field winding, a pair of control conductors, means connected with said output winding of said generator and with said control conductors for applying a direct current voltage across said control conductors which is a function of the output voltage of said generator, first and second oscillator circuits including, respectively, first and second unijunction transistors connected with said control conductors, each oscillator circuit including a resistor and a capacitor having a junction connected respectively with an emitter of a respective unijunction transistor, a control circuit connected across said control conductors and having junctions connected respectively with the emitters of said unijunction transistors, said control circuit operative to bias said first unijunction transistor conductive and said second unijunction transistor nonconductive when the output voltage applied to said control conductors is below a predetermined value, said control circuit operative to bias said first unijunction transistor nonconductive and said second unijunction transistor conductive when the voltage applied to said control conductors is above said predetermined value, means coupling said first unijunction transistor and said first controlled rectifier and means coupling said second unijunction transistor and said second controlled rectifier.

3. An electrical system comprising, an alternating current generator having an output winding, a bucking field winding and a main field winding, at least one first controlled rectifier connected with said output winding and said main field winding for controlling current flow through said main field winding, at least one other second controlled rectifier connected with said output winding and with said bucking field winding for controlling the current flow in said bucking field winding, control conductor means, means connected between said output winding and said control conductor means for applying a direct current control voltage to said control conductor means which is a function of the output voltage of said generator, first and second transistors, means connecting the collectors of said first and second transistors with one of said control conductor means, a first resistor connecting the emitters of said transistors to the other of said control conductor means, a voltage divider connected across said conductor means, means connecting the base of said first transistor with said voltage divider, a second resistor and a Zener diode connected across said control conductor means, means connecting the base of said second transistor with a junction of said Zener diode and said second resistor, first and second oscillator circuits, means connecting the output of said first oscillator circuit with the gate of said first controlled rectifier whereby said first oscillator circuit can provide gate turn-on signals for said first controlled rectifier, means connecting the output of said second oscillator with the gate of said second controlled rectifier whereby said second oscillator circuit is operative at times to supply turn-on signals to the gate of said second controlled rectifier, means coupling the collector of said first transistor with said first oscillator circuit, the voltage of said collector determining whether or not said first oscillator circuit is operative, and means connecting the collector of said second transistor with said second oscillator circuit whereby the voltage at said second collector controls said second oscillator, said voltages at the collectors of said transistors varying inversely with respect to each other as the direct current voltage applied to said conductor means varies.

4. In combination: a generator including an output winding, a boosting field winding and a bucking field winding, the output winding providing a polyphase output voltage having a magintude which increases in response to the application of a voltage to the boosting field winding and which decreases in response to the application of a voltage to the bucking field winding; first and second groups of controlled rectifiers each including anode, cathode and gate electrodes, the first group of controlled rectifiers connected via the anode and the cathode electrodes between the output winding and the boosting field winding for rectifying the polyphase output voltage and for applying the rectified voltage to the boosting field winding when the controlled rectifiers are energized by the application of a constant gate voltage to the gate electrodes, the second group of controlled rectifiers connected via the anode and the cathode electrodes between the output winding and the bucking field winding for rectifying the polyphase output voltage and for applying the rectified voltage to the bucking field winding when the controlled rectifiers are energized by the application of a constant gate voltage to the gate electrodes; first and second oscillators for providing first and second gate voltages when rendered operative, the first oscillator connected with the gate electrodes of the first group of controlled rectifiers for applying the first gate voltage to the gate electrodes of the first group of controlled rectifiers to energize the controlled rectifiers, the second oscillator connected with the gate electrodes of the second group of controlled rectifiers for applying the second gate voltage to the gate electrodes of the second group of controlled rectifiers to energize the controlled rectifiers, the frequency of the first and second gate voltages being substantially greater than the frequency of the polyphase output voltage so that the operation of the first and second groups of controlled rectifiers is effectively the same as if the first and second gate voltages were constant gate voltages; and a control circuit connected with the output winding for sensing the magnitude of the polyphase output voltage with respect to a predetermined reference magnitude, and connected with the first and second oscillators for rendering the first oscillator operative and the second oscillator inoperative when the magnitude of the output voltage is below the reference magnitude and for rendering the second oscillator operative and the first oscillator inoperative when the magnitude of the output voltage is above the reference magnitude, whereby the magnitude of the polyphase output voltage is nominally maintained at the predetermined reference magnitude.

References Cited

UNITED STATES PATENTS 2,882,480    4/1959    Bradburn et al. _____ 322—64 X
3,209,234    9/1965    Bridgeman et al. _____ 322—73 X ORIS L. RADER, Primary Examiner H. HUBERFELD, Assistant Examiner U.S. Cl. X.R.

322—64, 73